US011917595B2

United States Patent
Osawa et al.

(10) Patent No.: US 11,917,595 B2
(45) Date of Patent: Feb. 27, 2024

(54) COMMUNICATION DEVICE AND BASE STATION

(71) Applicant: NTT DOCOMO, INC., Tokyo (JP)

(72) Inventors: Ryosuke Osawa, Tokyo (JP); Kazuaki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 577 days.

(21) Appl. No.: 17/255,475

(22) PCT Filed: Jul. 3, 2018

(86) PCT No.: PCT/JP2018/025265
§ 371 (c)(1),
(2) Date: Dec. 23, 2020

(87) PCT Pub. No.: WO2020/008539
PCT Pub. Date: Jan. 9, 2020

(65) Prior Publication Data
US 2021/0160876 A1 May 27, 2021

(51) Int. Cl.
*H04W 72/04* (2023.01)
*H04W 72/0453* (2023.01)
*H04W 72/0446* (2023.01)
*H04W 72/20* (2023.01)

(52) U.S. Cl.
CPC ... *H04W 72/0453* (2013.01); *H04W 72/0446* (2013.01); *H04W 72/20* (2023.01)

(58) Field of Classification Search
CPC ......... H04W 72/0453; H04W 72/0446; H04W 72/20; H04W 4/40; H04W 76/14; H04W 92/18; H04L 5/0091
See application file for complete search history.

(56) References Cited

U.S. PATENT DOCUMENTS

| 2018/0183551 A1* | 6/2018 | Chou | H04W 74/006 |
| 2020/0259627 A1* | 8/2020 | Loehr | H04L 5/0092 |
| 2021/0168766 A1* | 6/2021 | Su | H04W 72/0453 |

(Continued)

FOREIGN PATENT DOCUMENTS

| WO | 2015/053382 A1 | 4/2015 |
| WO | 2015/162640 A1 | 10/2015 |

OTHER PUBLICATIONS

3GPP TSG RAN meeting #75; RP-170376 "Status Report to TSG" Kazuaki Takeda; Dubrovnik, Croatia; Mar. 6-9, 2017 (157 pages).

(Continued)

*Primary Examiner* — Hashim S Bhatti
(74) *Attorney, Agent, or Firm* — Osha Bergman Watanabe & Burton LLP

(57) ABSTRACT

A communication device includes a receiving unit that receives at least one of configuration information of a same center frequency used for downlink reception and sidelink reception in one slot or configuration information of a same center frequency used for uplink transmission and sidelink transmission in the one slot; and a control unit that configures, based on the received configuration information, at least one of the same center frequency for the downlink reception and the sidelink reception in the one slot or the same center frequency for the uplink transmission and the sidelink transmission in the one slot.

4 Claims, 12 Drawing Sheets

(56) References Cited

U.S. PATENT DOCUMENTS

2021/0258922 A1* 8/2021 Xiao .................... H04W 72/02
2021/0352623 A1* 11/2021 Wang ................ H04W 72/0453

OTHER PUBLICATIONS

Extended European Search Report issued in European Application No. 18925213.3, dated Jan. 19, 2022 (10 pages).
International Search Report issued in Application No. PCT/JP2018/025265, dated Sep. 18, 2018 (3 pages).
3GPP TS 38.213 V15.1.0, Release 15; "3rd Generation Partnership Project; Technical Specification Group Radio Access Network; NR; Physical layer procedures for control;" Mar. 2018; Sophia Antipolis Valbonne, France (77 pages).
3GPP TS 38.211 V15.1.0, Release 15; "3rd Generation Partnership Project; Technical Specification Group Radio Access Network; NR; Physical channels and modulation;" Mar. 2018; Sophia Antipolis Valbonne, France (90 pages).
3GPP TSG RAN Meeting #80; RP-181429; "New SID: Study on NR V2X;" Vodafone; Jun. 11-14, 2018; La Jolla, USA (5 pages).

* cited by examiner

SELECT RADIO RESOURCE FROM SYNCHRONIZED COMMON TIME/FREQUENCY GRID

Typical long-PUCCH format

Typical short-PUCCH format

COMMUNICATION DEVICE AND BASE STATION

TECHNICAL FIELD

The present invention relates to a communication device and a base station in a radio communication system.

BACKGROUND ART

In Long Term Evolution (LTE), successor systems of LTE (for example, LTE Advanced (LTE-A), and New Radio (NR) (also called 5G)), technology of sidelink (device to device (D2D)) has been studied in which communication devices such as UEs perform communication directly with each other without going through a base station (for example, Non-Patent Document 1).

Furthermore, implementation of vehicle to everything (V2X) has been studied, and a specification has been developed. Here, V2X is a part of intelligent transport systems (ITS) and is a generic term of vehicle to vehicle (V2V) meaning a communication mode performed between vehicles, vehicle to infrastructure (V2I) meaning a communication mode performed between a vehicle and a road-side unit (RSU) installed on a road side, vehicle to nomadic device (V2N) meaning a communication mode performed between a vehicle and a mobile terminal of a driver, and vehicle to pedestrian (V2P) meaning a communication mode performed between a vehicle and a mobile terminal of a pedestrian as illustrated in FIG. 1.

RELATED ART DOCUMENT

Non-Patent Document

Non-Patent Document 1: 3GPP TS 38.213 V15.1.0 (2018-03)
Non-Patent Document 2: 3GPP TS 38.211 V15.1.0 (2018-03)
Non-Patent Document 3: 3GPP TSG RAN Meeting #80, PR-181429, La Jolla, USA, Jun. 11 to 14, 2018

SUMMARY OF THE INVENTION

Problem to be Solved by the Invention

In a case in which transmissions or receptions of sidelink (SL) and downlink (DL)/uplink (UL) of cellular communication are consecutively performed within the same slot, for example, if different bandwidth parts (or numerologies) are applied between SL and DL/UL, communication efficiency is likely to be lowered.

There is a need for a technique capable of suppressing a decrease in communication efficiency in a case in which transmissions or receptions of SL and DL/UL are consecutively performed within the same slot.

Means for Solving the Problem

According to an aspect of the present invention, there is provided a communication device including a receiving unit that receives at least one of configuration information of a same center frequency used for downlink reception and sidelink reception in one slot or configuration information of a same center frequency used for uplink transmission and sidelink transmission in the one slot; and a control unit that configures, based on the received configuration information, at least one of the same center frequency for the downlink reception and the sidelink reception in the one slot or the same center frequency for the uplink transmission and the sidelink transmission in the one slot.

Advantage of the Invention

According to the disclosed technology, a technique is provided that is capable of suppressing a decrease in communication efficiency in a case in which transmissions or receptions of SL and DL/UL are consecutively performed within the same slot.

EMBODIMENTS OF THE INVENTION

Hereinafter, embodiments of the present invention are described with reference to the appended drawings. The embodiments described below are an example, and embodiments to which the present invention is applied are not limited to the following embodiments.

In the embodiments, it is assumed that a direct communication scheme between communication devices is sidelink (SL) of LTE or NR, but the direct communication scheme is not limited to this scheme. Furthermore, the name "sidelink" is an example, and uplink (UL) may include a function of SL without using the name "sidelink." The SL may be distinguished from downlink (DL) or UL by a difference in a frequency or time resource or may be another name.

Furthermore, UL and SL may be distinguished by a difference of one or more combinations of a time resource, a frequency resource, a time/frequency resource, a reference signal to be referred to so as to determine a path loss in transmission power control, and a reference signals (PSS/SSS/PSSS/SSSS) used for synchronization.

For example, in UL, a reference signal of an antenna port X is used as the reference signal to be referred to so as to determine the path loss in the transmission power control, and in SL (including UL used as SL), a reference signal of an antenna port Y is used as the reference signal to be referred to so as to determine the path loss in the transmission power control.

Furthermore, in the embodiments, a configuration in which a communication device is installed in a vehicle is mainly assumed, but an embodiment of the present invention is not limited to this configuration. For example, a communication device may be a terminal carried by a person, a communication device may be a drone or a device installed in an aircraft, and a communication device may be a base station, an RSU, a relay station, or the like as well.

Overview of Sidelink

In the embodiment, since sidelink is a basic technique used here, first, an overview of sidelink is described as a basic example. An example of a technique described here is a technique specified in Rel. 14 of 3GPP or the like. This technique may be used in NR, or a technique different from this technique may be used in in NR.

Figure 1:
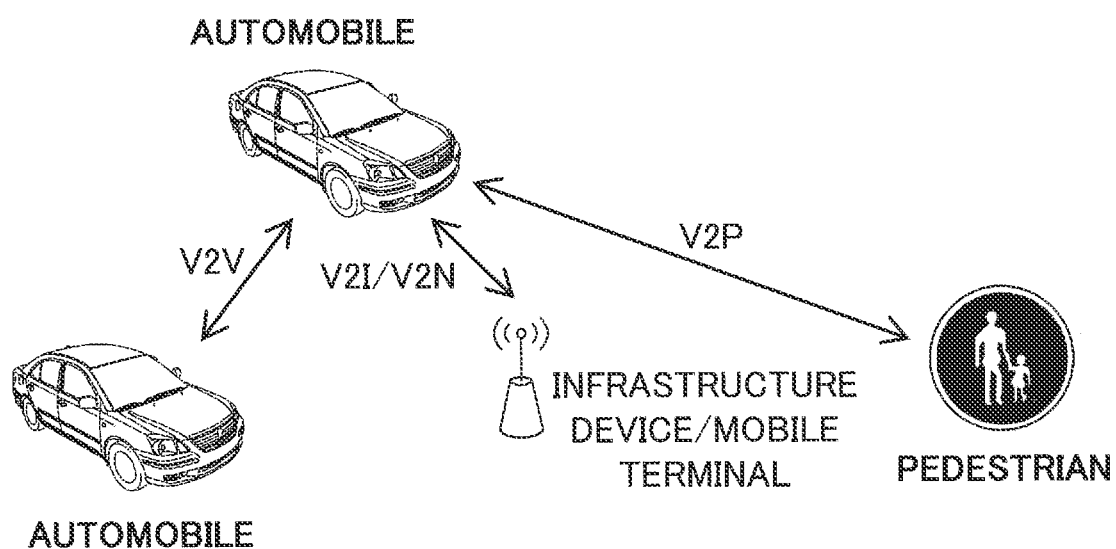
FIG. 1 is a diagram for illustrating V2X.
Figure 2A:
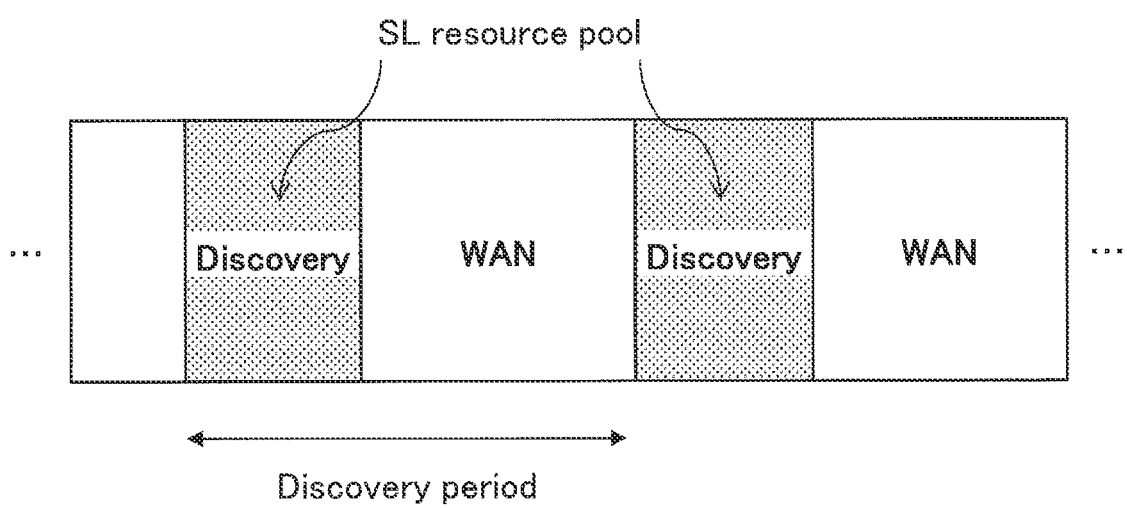
FIG. 2A is a diagram for illustrating sidelink.

Sidelink is roughly divided into "discovery" and "communication." For "discovery," as illustrated in FIG. 2A, a discovery message resource pool is configured for each discovery period, and a communication device (referred to as a UE) transmits a discovery message (discovery signal) within the resource pool. More specifically, there are Type 1 and Type 2b. In Type 1, a communication device autonomously selects a transmission resource from the resource pool. In Type 2b, a quasi-static resource is allocated by higher layer signaling (for example, an RRC signal).

Figure 2B:
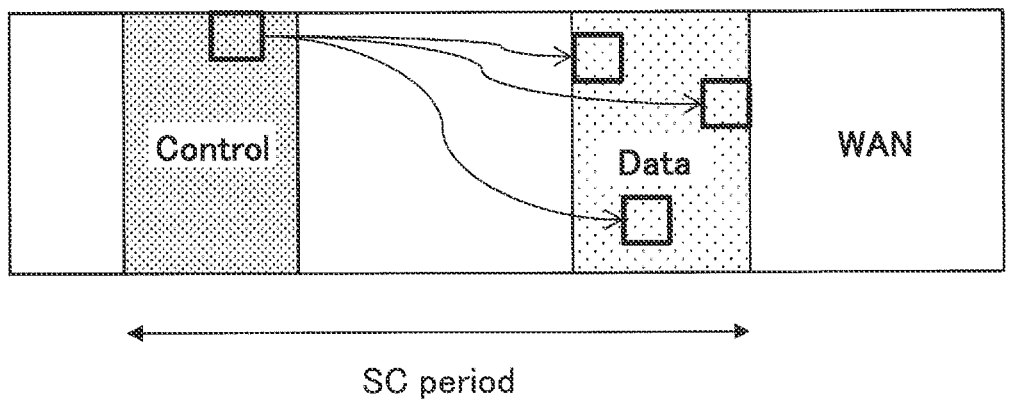
FIG. 2B is a diagram for illustrating sidelink.

For "communication," as illustrated in FIG. 2B, a sidelink control information (SCI)/data transmission resource pool is periodically configured. A communication device on a transmission side notifies a reception side of a data transmission resource (PSSCH resource pool) or the like through the SCI with the resource selected from the control resource pool (PSCCH resource pool), and transmits data with the data transmission resource. For "communication," in further detail, there are a mode 1 and a mode 2. In the mode 1, resources are dynamically allocated by an (enhanced) physical downlink control channel ((E) PDCCH) transmitted from a base station to a communication device. In the mode 2, a communication device autonomously selects a transmission resource from the resource pool. For example, the resource pool is notified of through SIB, for example, and is predefined.

In Rel-14, in addition to the mode 1 and the mode 2, there are a mode 3 and a mode 4. In Rel-14, SCI and data can be transmitted simultaneously (in one sub frame) with resource blocks that are adjacent in a frequency direction. The SCI is also referred to as scheduling assignment (SA).

A channel used for "discovery" is referred to as a physical sidelink discovery channel (PSDCH), a channel for transmitting control information such as the SCI in "communication" is referred to as a physical sidelink control channel (PSCCH), and a channel for transmitting data is referred to as a physical sidelink shared channel (PSSCH). The PSCCH and the PSSCH have a PUSCH-based structure and have a structure in which a demodulation reference signal (DMRS) is inserted.

Figure 3:
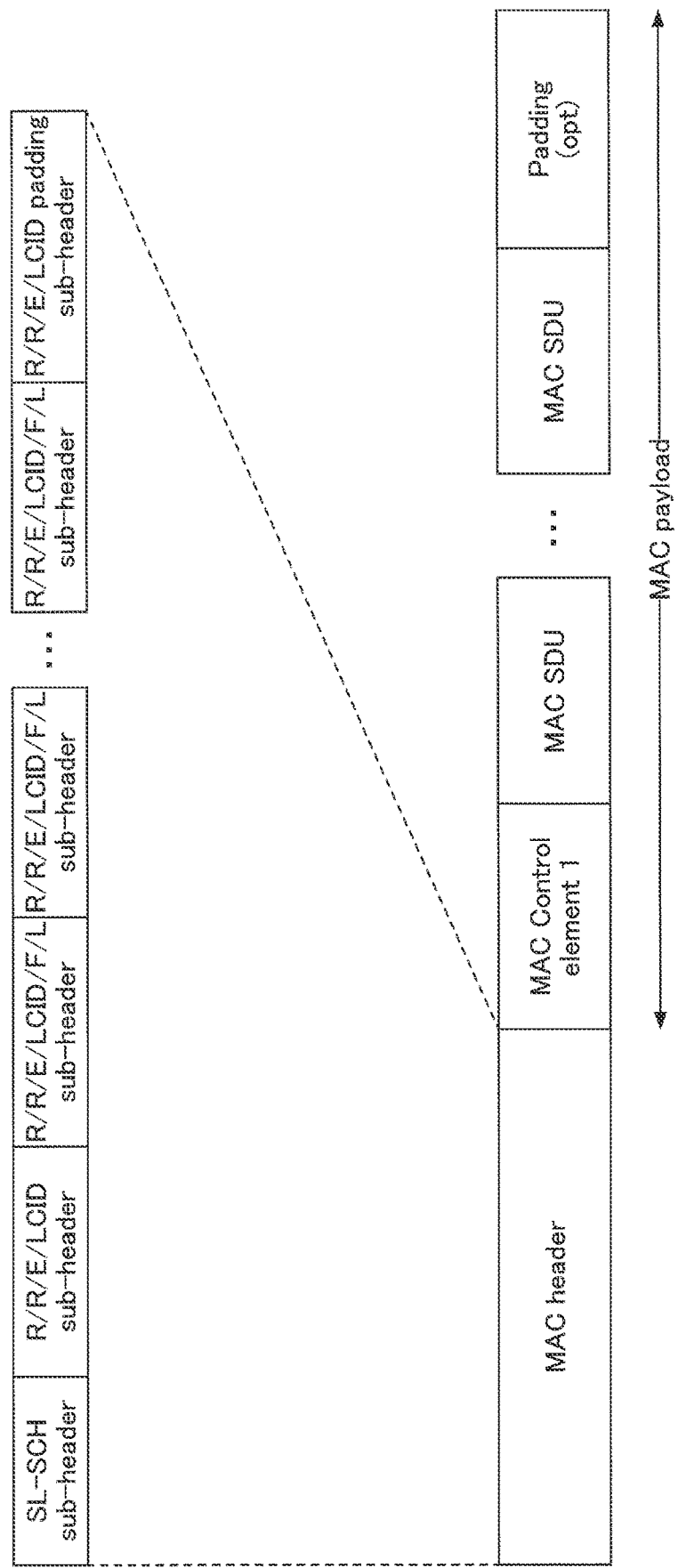
FIG. 3 is a diagram for illustrating a MAC PDU used for sidelink communication.

As illustrated in FIG. 3, a medium access control (MAC) protocol data unit (PDU) used for sidelink includes at least a MAC header, a MAC control element, a MAC service data unit (SDU), and padding. The MAC PDU may include other information. The MAC header includes one a sidelink shared channel (SL-SCH) subheader and one or more MAC PDU subheaders.

Figure 4:
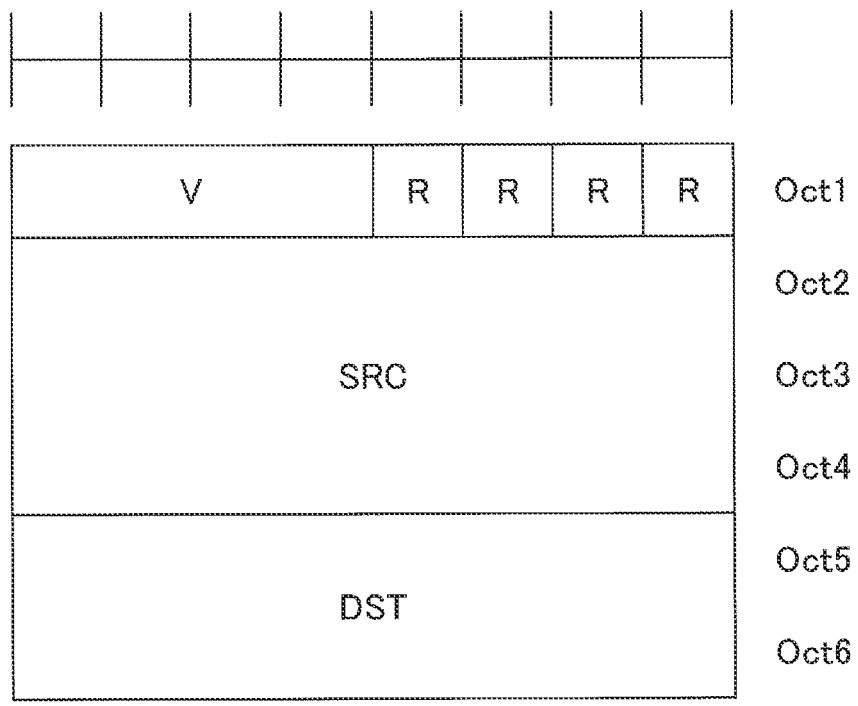
FIG. 4 is a diagram for illustrating a format of an SL-SCH subheader.

As illustrated in FIG. 4, the SL-SCH subheader includes a MAC PDU format version (V), transmission source information (SRC), transmission destination information (DST), reserved bits (R), and the like. V is allocated to the head of the SL-SCH subheader and indicates the MAC PDU format version used by the communication device. Information related to a transmission source is configured in the transmission source information. An identifier related to a ProSe UE ID may be configured in the transmission source information. Information related to a transmission destination is configured in the transmission destination information. Information related to a ProSe Layer-2 Group ID of the transmission destination may be configured in the transmission destination information.

Figure 5:
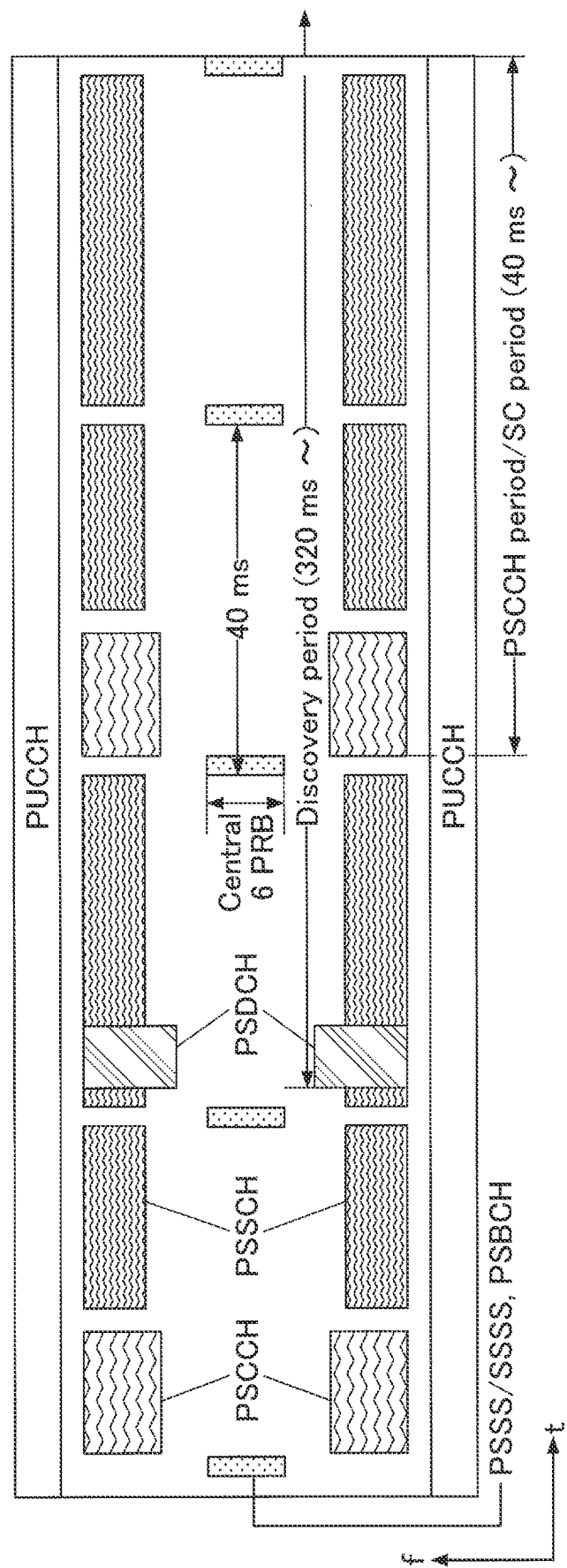
FIG. 5 is a diagram for illustrating an example of a channel structure used in sidelink.

An example of a channel structure of sidelink is illustrated in FIG. 5. As illustrated in FIG. 5, the resource pool of the PSCCH used for "communication" and the resource pool of the PSSCH are allocated. Furthermore, the resource pool of the PSDCH used for "discovery" is allocated at a period longer than a period of a channel of "communication."

A Primary Sidelink Synchronization signal (PSSS) and a secondary sidelink synchronization signal (SSSS) are used as synchronization signals for sidelink. For example, a physical sidelink broadcast channel (PSBCH) for transmitting broadcast information such as a system band of sidelink, a frame number, and resource configuration information is used for an operation outside a coverage. The PSSS/SSSS and the PSBCH are transmitted, for example, in one sub frame. The PSSS/SSSS is also referred to as an SLSS.

V2X assumed in the embodiments is a scheme related to "communication." However, in the embodiments, there may be no distinction between "communication" and "discovery." Furthermore, the technology according to the embodiments may be applied in "discovery."

System Configuration

Figure 6:
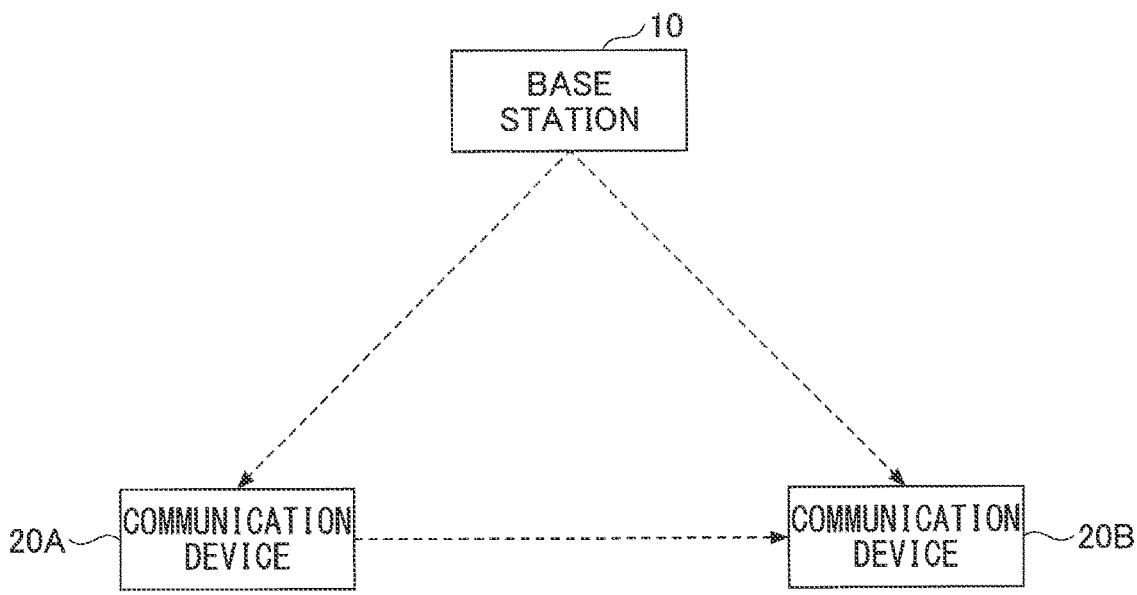
FIG. 6 is a diagram indicating a configuration example of a radio communication system according to an embodiment.

FIG. 6 is a diagram illustrating a configuration example of a radio communication system according to the embodiments. As illustrated in FIG. 6, the radio communication system according to the embodiments includes a base station 10, a communication device 20A, and a communication device 20B. Note that, actually, there may be many communication devices, but FIG. 6 illustrates the communication device 20A and the communication device 20B as an example.

In FIG. 6, it is intended that the communication device 20A is the transmission side, the communication device 20B is the reception side, but both the communication device 20A and the communication device 20B have both the transmission function and the reception function. Hereinafter, when it is not necessary to particularly distinguish the communication devices 20A and 20B, the are referred to simply as a "communication device 20" or a "communication device." FIG. 6 illustrates a case in which the communication device 20A and the communication device 20B are both in the coverage as an example, but an operation according to the embodiments can be applied to a case in which all the communication devices 20 are within the coverage, a case in which some communication devices 20 are within the coverage, and the other communication devices 20 are outside the coverage, and a case in which all the communication devices 20 are outside the coverage.

In the embodiments, the communication device 20 is a device installed in a vehicle such as, for example, an automobile and has a cellular communication function as a UE in LTE or NR and a sidelink function. Furthermore, the communication device 20 has a function of acquiring report information (position, event information, or the like) as in a GPS device, a camera, or various types of sensors. Furthermore, the communication device 20 may be a general mobile terminal (such as a smartphone). Furthermore, the communication device 20 may be an RSU. The RSU may be a UE type RSU having a function of a UE, a BS type RSU (which is also referred to as a gNB type UE) having a function of a base station, or a relay station.

The communication device 20 need not be a device of one housing, and for example, even when various types of sensors are distributed and arranged in a vehicle, a device including various types of sensors is the communication device 20. Furthermore, the communication device 20 may have a function of performing transmission and reception of data with various types of sensors without including various types of sensors.

Furthermore, processing content of sidelink transmission of the communication device 20 is basically similar to processing content of UL transmission in LTE or NR. For example, the communication device 20 scrambles and modulates codewords of transmission data, generates complex-valued symbols, maps the complex-valued symbols (transmission signals) to one or two layers, and performs precoding. Then, the precoded complex-valued symbols are mapped to resource elements, and a transmission signal (for example, CP-OFDM or a DFT-s-OFDM) is generated and transmitted from each antenna port.

The base station 10 has a cellular communication function as a base station 10 in LTE or NR and a function (for example, resource pool configuring, resource allocation, and the like) for enabling communication of the communication device 20 in the embodiments. Furthermore, the base station 10 may be an RSU (a gNB type RSU), a relay station, or a communication device provided with a scheduling function.

Furthermore, in the radio communication system according to the embodiments, a signal waveform used for SL or UL by the communication device 20 may be an OFDMA, an SC-FDMA, or any other signal waveform. Furthermore, in the radio communication system according to the embodiments, as an example, a frame including a plurality of sub frames (for example, 10 sub frames) is formed in a time direction, and it includes a plurality of subcarriers in a frequency direction. One sub frame is an example of one transmission time interval (TTI). Here, the TTI is not necessarily a sub frame. For example, the TTI may be a slot, a mini-slot, or any other unit in the time domain. Furthermore, the number of slots per sub frame may be determined in accordance with the subcarrier spacing. Furthermore, the number of symbols per slot may be 14 symbols.

In the embodiments, the communication device 20 can operate in any mode among a mode 1 which is a mode in which resources are dynamically allocated by the ((enhanced) physical downlink control channel ((E) PDCCH) transmitted from the base station 10 to the communication device, a mode 2 which is a mode in which the communication device autonomously selects a transmission resource from a resource pool, a mode in which resource for SL signal transmission is allocated from the base station 10 (hereinafter referred to as a mode 3), and a mode in which a resource for SL signal transmission is autonomously selected (hereinafter referred to as a mode 4). The mode is configured, for example, in the communication device 20 from the base station 10.

Figure 7:
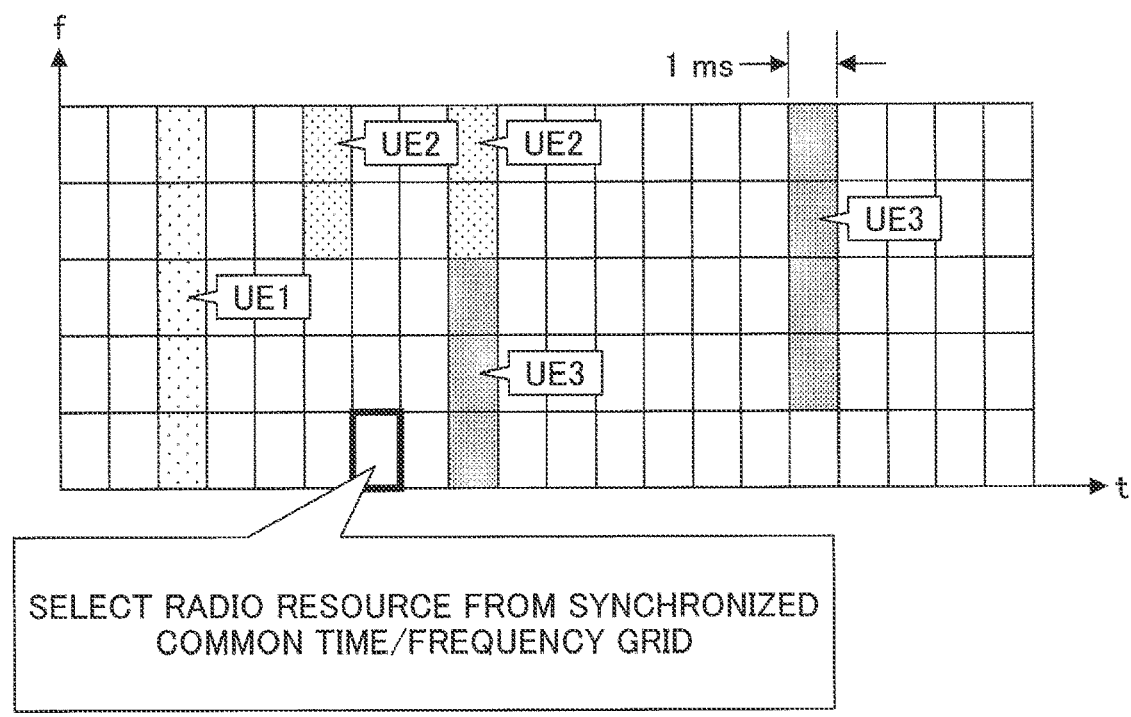
FIG. 7 is a diagram for illustrating a resource selection operation of a communication device.

As illustrated in FIG. 7, the communication device of the mode 4 (indicated by a UE in FIG. 7) selects a radio resource from a synchronized common time/frequency grid. For example, the communication device 20 performs sensing in the background, specifies resources which have a good sensing result and are not reserved for other communication devices as candidate resources, and selects a resource to be used for transmission from the candidate resources.

In Release 15 NR of 3GPP, a bandwidth part operation of dynamically switching a bandwidth in which a terminal performs transmission and reception is specified (Non-Patent Document 1). The bandwidth part refers to a subset of adjacent common resource blocks.

In downlink, a maximum of four bandwidth parts for a user equipment (UE) can be configured. In this case, a single downlink bandwidth part is activated at each time. The UE receives a physical downlink shared channel (PDSCH), a PDCCH, or a channel state information reference signal (CSI-RS) within an activated bandwidth part. In other words, it is assumed that the PDSCH, the PDCCH, and the CSI-RS are not transmitted outside the bandwidth part (Non-Patent Document 2).

Furthermore, in uplink, a maximum of four bandwidth parts for the UE can be configured. In this case, a single uplink bandwidth part is activated at each time. In a case in which supplementary uplink (SUL) is configured for the UE, a maximum of four bandwidth parts to the UE can be added in supplementary uplink. In this case, a single additional uplink bandwidth part is activated at each time. The UE does not transmit the PUSCH and the PUCCH outside the activated bandwidth part. In other words, the UE transmits the PUSCH or the PUCCH within the activated bandwidth part.

Figure 8:
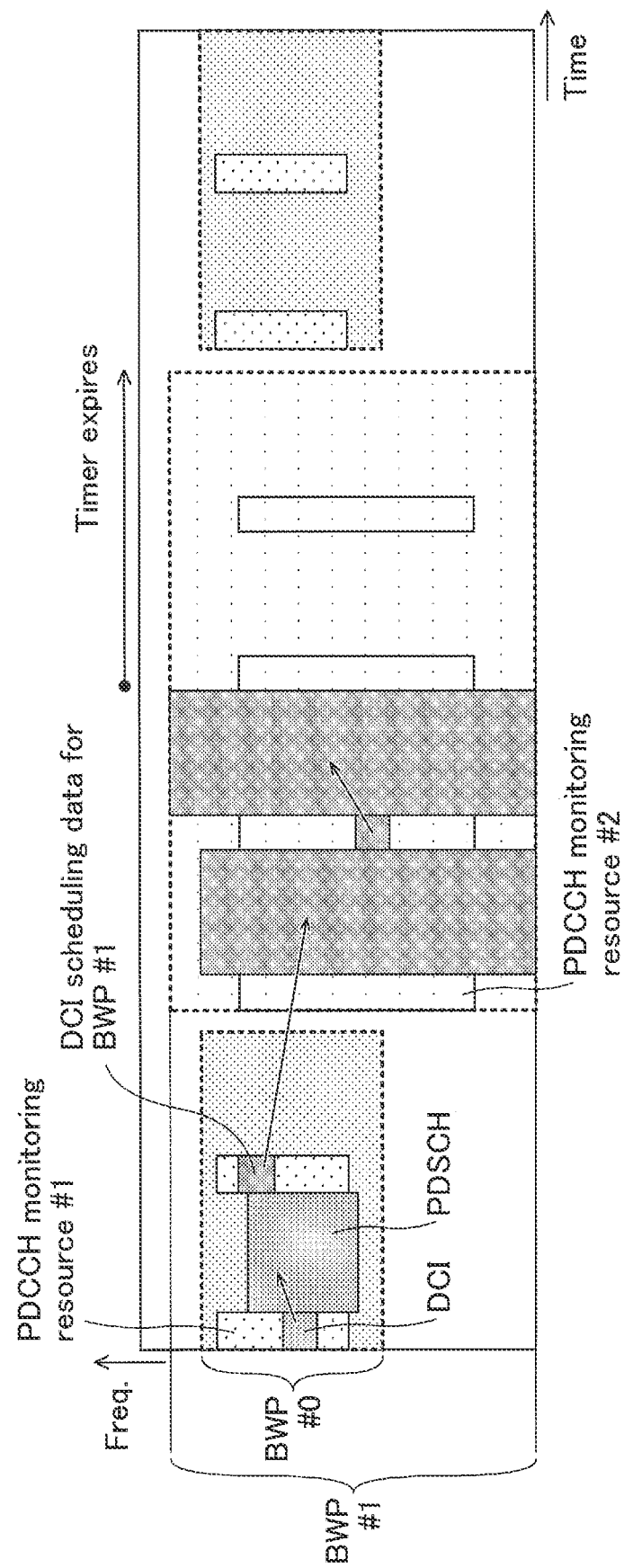
FIG. 8 is a diagram for illustrating an example of a bandwidth part operation.

An example of the bandwidth part operation is illustrated in FIG. 8. For example, at the time of initial-access, the UE recognizes only a minimum bandwidth (BW) necessary for the initial access and communicates with the base station in the minimum bandwidth. For example, in the example of FIG. 8, the UE communicates with the base station via a bandwidth part (BWP) #0.

Thereafter, the UE monitors the PDCCH and receives downlink control information (DCI) transmitted from the base station via the PDCCH. At this time, the DCI includes an index designating the bandwidth part. For example, in the example illustrated in FIG. 8, the DCI includes an index specifying the BWP #1. In response to the received DCI, the UE activates the BWP #1 and communicates with the base station via BWP #1 at a reception timing indicated by the received DCI.

A timer is used to deactivate the activated BWP. In the example of FIG. 8, the BWP #1 is deactivated when the timer expires, and the BWP #0 which is a default bandwidth part is activated at a next reception timing.

As described above, according to the bandwidth part operation in NR specified in Release 15 of 3GPP, it is possible to support communication by a UE operable with a bandwidth narrower than a maximum bandwidth specified in a system. The bandwidth part operation in this case is specified for uplink communication and downlink communication between a base station and a user equipment.

Currently, in 3GPP, a technical specification of Release 16 has been developed. The application of the bandwidth part operation to sidelink has been discussed, and a bandwidth part can be specified even in sidelink.

A sidelink design of NR is included in a Study Item of V2X of Release 16 of 3GPP. In addition to the bandwidth part, a technique which is newly introduced to DL/UL of NR of Release 15 of 3GPP is assumed to be applied to sidelink. In the following, an overview of multi-numerology and dynamic TDD is described, as an example of a technique which is newly introduced to DL/UL of 3GPP Release 15 NR.

Multi-Numerology

In order to support a wide frequency and a use case in 5G, it is necessary to support a plurality of numerologies (radio parameters such as subcarrier spacing and a symbol length). For this reason, it is effective to design variable parameters to be scalable, using the LTE numerology as a reference. Under this concept, multi-numerology of NR has been introduced. Specifically, reference subcarrier spacing is the same as the subcarrier spacing of LTE, and is assumed to be 15 kHz. By multiplying the reference subcarrier spacing by a power of 2, other subcarrier spacings are specified.

According to Non-Patent Document 2, a plurality of OFDM numerologies, that is, subcarrier spacing configurations $\mu$ are specified. Specifically, subcarrier spacings $\Delta f=15$ kHz, 30 kHz, 60 kHz, 120 kHz, and 240 kHz are specified for $\mu=0, 1, 2, 3$, and 4.

Here, according to Table 4.3.2-1 of Non-Patent Document 2, the number of OFDM symbols included in one slot is 14 for any of the subcarrier spacing configurations $\mu=0, 1, 2, 3$, and 4. However, for the subcarrier spacing configurations $\mu=0, 1, 2, 3$, and 4, the number of slots included in one frame is 10, 20, 40, 80, and 160, and the number of slots included in one sub frame are 1, 2, 4, 8, and 16. Here, since a frame length is 10 ms, a slot length is 1 ms, 0.5 ms, 0.25 ms, 0.125 ms, and 0.0625 ms for the subcarrier spacing configurations $\mu=0, 1, 2, 3$, and 4. Since the number of OFDM symbols included in one slot is 14 for any of the subcarrier spacing configurations $\mu=0, 1, 2, 3$, and 4, the OFDM symbol length differs for each subcarrier spacing configuration. For the subcarrier spacing configuration $\mu=0, 1, 2, 3$, and 4, the OFDM symbol length is (1/14) ms, (0.5/14) ms, (0.25/14) ms, (0.125/14) ms, and (0.0625/14) ms. By reducing the slot length and the OFDM symbol length as described above, low delay communication can be realized.

Dynamic TDD

Similar to LTE, in NR, both frequency division duplex (FDD) and time division duplex (TDD) are supported. In particular, in TDD, dynamic TDD (flexible duplex) in which a communication direction (UL/DL) is dynamically switched in the time domain (or the frequency domain) for efficient traffic accommodation is supported.

In TDD of LTE, a communication direction is configured by a UL/DL configuration in a static/semi-static manner. In contrast, in TDD of NR, a communication direction is dynamically switched depending on a traffic state in a cell.

In Table 4.3.2-3 of Non-Patent Document 2, various slot formats are specified. According to Non-Patent Document 2, OFDM symbols in one slot are classified into downlink (written as D in Table 4.3.2-3), flexible (written as X in Table 4.3.2-3), or uplink (written as U in Table 4.3.2-3). As illustrated in Table 4.3.2-3, in the slot format of NR, allocation of DL and UL is performed in units of symbols. In contrast, in the case of LTE, allocation of DL and UL is performed in units of sub frames.

By the signaling of allocation information for allocating any one slot format illustrated in Table 4.3.2-3 to each of a plurality of slots included in a frame, dynamic TDD (flexible TDD) can be achieved in which the communication direction (UL/DL) is dynamically switched in the time domain (or the frequency domain).

Figure 9:
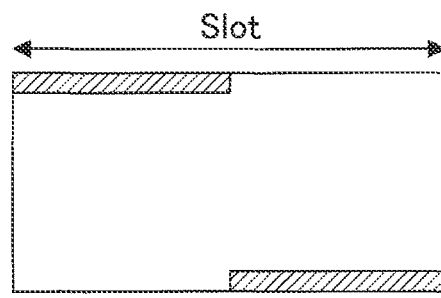
FIG. 9 is a diagram illustrating an example of a long-PUCCH format and a short-PUCCH format.
Figure 9:
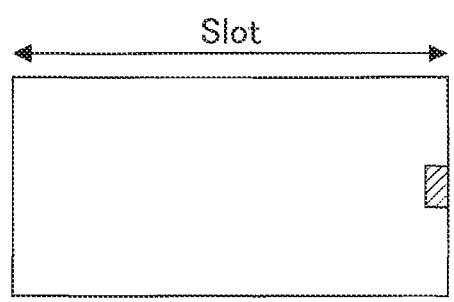

In addition to the above-described technique, for example, as illustrated in FIG. 9, a short-PUCCH format and a long-PUCCH format have been introduced in 3GPP Release 15 UL.

In sidelink communication, since the combination of radio parameters, such as the numerology, the bandwidth part, and the slot length, that can be supported by the communication counterpart is different, if the combination of the radio parameters, such as the numerology, the bandwidth part, and the slot length, is uniformly configured at the time of transmission and reception, a user equipment that is unable to support the configured combination of the radio parameters is unlikely to be able to perform communication.

Figure 10:
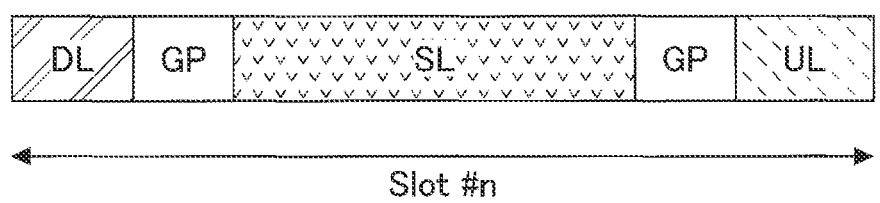
FIG. 10 is a diagram illustrating an example in which scheduling of SL and DL/UL is performed in a same slot.

Furthermore, a method of performing scheduling of SL and DL/UL in the same slot as illustrated in FIG. 10 can be considered. As illustrated in FIG. 10, scheduling information of SL and UL may be included in information transmitted through a symbol included in a portion indicated by DL in the head in a slot #n. However, SL may be separately scheduled through RRC or the like.

In a case in which transmissions or receptions of SL and DL/UL of cellular communication are consecutively performed as in the above-described method, if different bandwidth parts (or numerologies) are applied between SL and DL/UL, a guard period (GP) for switching the bandwidth part (or numerology) configuration increases, and the number of symbols that can be used for transmission/reception may decrease.

In other words, in a case in which receptions of SL and DL/UL are consecutively performed, if different bandwidth part (or numerology) configurations are applied between SL and DL/UL, in order to cope with the different bandwidth part (or numerology) configurations, it is necessary to change a configuration in a transmission side radio and a reception side radio, and it is likely to be necessary to configure the GP to be longer in association with a time required for changing the configuration. From the perspective of enhancing the communication efficiency, it is desirable to reduce the GP.

Method

As a method for solving the above-described problem, a method of applying the same bandwidth part (or numerology) configuration is applied to reception of DL and reception of SL in the communication device 20 and applying the same bandwidth part (or numerology) configuration to transmission of UL and transmission of SL in the communication device 20A is considered. Here, it is described that "Bandwidth part (or Numerology)" because the numerology refers to a subcarrier spacing configuration, and the subcarrier spacing configuration is included in the bandwidth part configuration.

Here, a physical resource block (PRB) location configuration, a subcarrier spacing configuration, and a cyclic prefix configuration may be included in the bandwidth part configuration. In the above-described method, all of the PRB location configuration, the subcarrier spacing configuration, and the cyclic prefix configuration may be common, or some of the PRB location configuration, the subcarrier spacing configuration, and the cyclic prefix configuration may be common. For example, the PRB location configuration includes a center frequency configuration and a bandwidth (and subcarrier spacing) configuration, but the center frequency configuration may be common between reception of DL and reception of SL, and the bandwidth (and subcarrier spacing) configuration may be differently configured between reception of DL and the reception of SL. Furthermore, for example, the center frequency configuration may be common between transmission of UL and transmission of SL by the communication device 20, and the bandwidth (and subcarrier spacing) configuration may be differently configured between transmission of UL and transmission of SL by the communication device 20.

In the above-described method, the bandwidth part configuration between DL/UL in the communication device 20 may be different. However, in the above-described method, at least a part of the bandwidth part (or numerology) configuration needs to coincide between reception of DL and reception of SL in the communication device 20, and at least a part of the bandwidth part (or numerology) configuration needs to coincide between transmission of UL and transmission of SL in the communication device 20.

In the above-described method, the GP may be inserted at the time of switching of SL/DL/UL or at the time of switching of transmission/reception in the communication device 20.

Furthermore, in the above-described method, the switching of the bandwidth part (or numerology) of SL in the communication device 20 is performed using a slot as a reference with respect to time. However, the reference related to the switching time of the bandwidth part (or numerology) of SL in the communication device 20 is not limited to the slot, and may be, for example, any one of a symbol, a mini-slot, a subframe, and a radio frame as a reference with respect to time.

A slot configuration in which DL, UL, and SL coexist in the communication device 20 may be configured through RRC signaling from the base station 10 or may be designated in the specifications.

Specific examples of the above-described method are described below with reference to FIGS. 11 to 13.

Figure 11A:
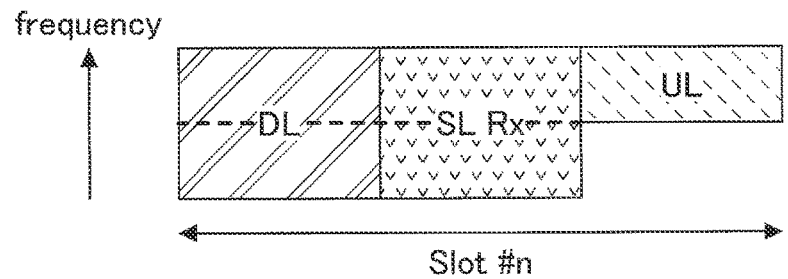
FIG. 11A is a diagram illustrating an example 1 of a method.
Figure 11B:
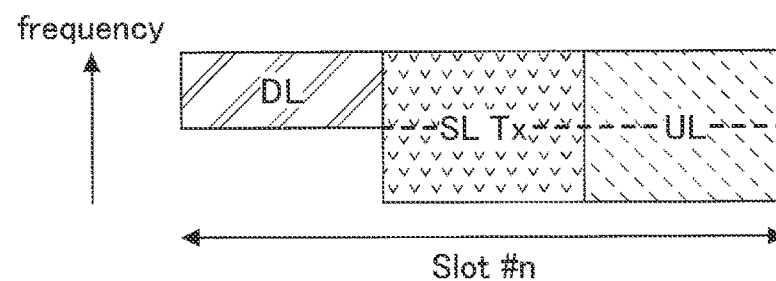
FIG. 11B is a diagram illustrating the example 1 of the method.

FIGS. 11A and 11B are diagrams for illustrating an example 1 of the above-described method. In FIG. 11A, the same center frequency and bandwidth as the center frequency and bandwidth applied to reception of DL in the communication device 20 are applied to reception of SL in the communication device 20. Furthermore, in FIG. 11B, the same center frequency and bandwidth as the center frequency and bandwidth applied to transmission of UL in the communication device 20 are applied to transmission of SL in the communication device 20. Here, in FIG. 11A, the center frequency and the bandwidth of transmission of UL in the communication device 20 may be configured to be any center frequency and any bandwidth. Furthermore, in FIG. 11B, the center frequency and bandwidth of reception of DL in the communication device 20 may be configured to be any center frequency and any bandwidth.

Figure 12A:
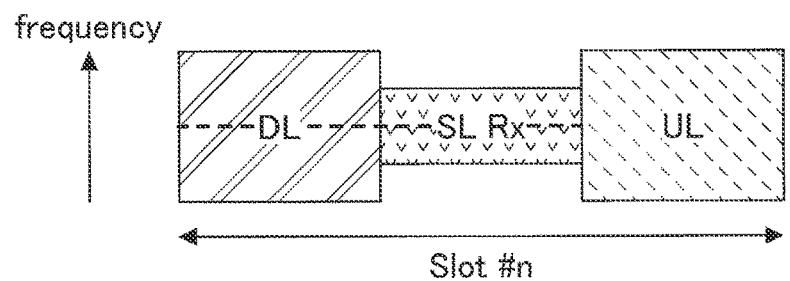
FIG. 12A is a diagram illustrating an example 2 of the method.
Figure 12B:
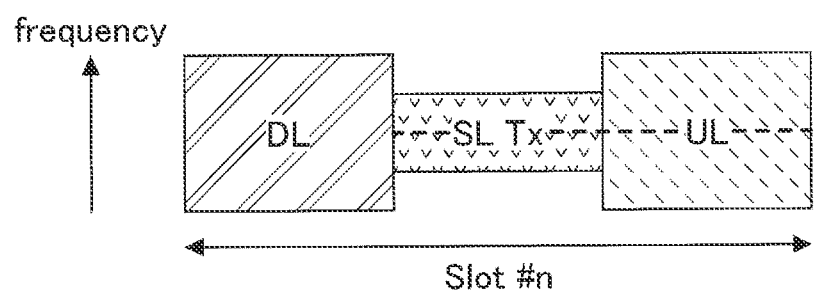
FIG. 12B is a diagram illustrating the example 2 of the method.

FIGS. 12A and 12B are diagrams for illustrating an example 2 of the above-described method. In FIG. 12A, the center frequency applied to reception of DL in the communication device 20 is identical to the center frequency applied to reception of SL in the communication device 20. However, the bandwidth applied to reception of DL in the communication device 20 is different from the bandwidth applied to reception of SL in the communication device 20. Furthermore, in FIG. 12B, the center frequency applied to transmission of UL in the communication device 20 is identical to the center frequency applied to transmission of SL in the communication device 20. However, the bandwidth applied to transmission of UL in the communication device 20 is different from the bandwidth applied to transmission of SL in the communication device 20. Here, in FIG. 12A, the center frequency and the bandwidth of transmission of UL in the communication device 20 may be configured to be any center frequency and any bandwidth. Furthermore, in FIG. 12B, the center frequency and bandwidth of reception of DL in the communication device 20 may be configured to be any center frequency and any bandwidth.

Figure 13:
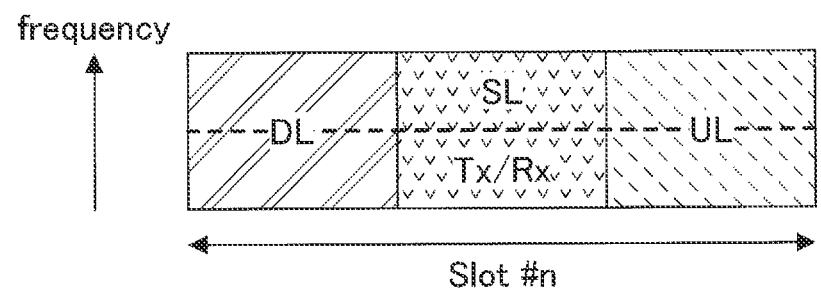
FIG. 13 is a diagram illustrating an example 3 of the method 1.

FIG. 13 is a diagram for illustrating an example 3 of the above-described method. In FIG. 13, the same center frequency and the same bandwidth are applied to reception of DL, transmission of UL, reception of SL, and transmission of SL in the communication device 20.

As a first example of signaling for implementing the above-described method, a method in which the base station 10 does not notify the communication device 20 of the bandwidth part (or numerology) configuration of SL, and the communication device 20 selects the bandwidth part configuration of SL on the basis of an index of a bandwidth part of DL/UL is considered. In this case, the communication device 20 may apply the bandwidth part configuration of reception of DL to reception of SL and apply the bandwidth part configuration of transmission of UL to transmission of SL.

As a second example of signaling for implementing the above-described method, for example, the base station 10 may generate a plurality of combinations of bandwidth part (or numerology) configurations for reception of DL and reception of SL and bandwidth part (or numerology) configurations for transmission of UL and transmission of SL, the base station 10 may then allocate an index corresponding to each of a plurality of combinations, and the base station 10 may then notify the communication device 20 of the indexes corresponding to a plurality of combinations through downlink control information (DCI) and/or sidelink control information (SCI) when a specific combination among a plurality of combinations is specified to the communication device 20.

As a third example of signaling for implementing the above-described method, for example, the base station 10 may configure the bandwidth part (or numerology) of SL independently of the bandwidth part (or numerology) of DL/UL, and the base station 10 may then notify the communication device 20 of a control signal indicating the bandwidth part (or numerology) configuration of SL through the DCI and/or the SCI. In this case, the communication device 20 may apply different bandwidth parts (or numerologies) to transmission of SL and reception of SL. Additionally, the base station 10 may allocate one index to each pair of transmission of SL and reception of SL or may allocate different indexes to transmission of SL and reception of SL.

In the above-described method, the bandwidth part (or numerology) configuration may be performed through a DL signal (which may be any one of a physical layer signal, a MAC layer signal, and an RRC layer signal) transmitted through any one of a physical broadcast channel (PBCH), a physical downlink control channel (PDCCH), and a physical downlink shared channel (PDSCH) or a combination thereof from the base station or may be specified in the specification.

In the above-described method, the example in which the bandwidth part (or numerology) configuration in the communication device 20 is set to be common to SL and UL/DL is described, but the present invention is not limited to a case in which the above method is applied to the bandwidth part (or numerology). For example, by applying the above-described method, a transmission/reception method related to whether the mini-slot is supported, whether multi-layer transmission of SL is supported (including information of a maximum of the number of layers and/or the number of ports), or the like for transmission/reception of SL and UL/DL in the communication device 20 may be determined.

UL and SL may be distinguished by a difference in any one of a time/frequency resource, a synchronization signal to be referred to, and a reference signal to be referred to for determining a path loss in transmission power control or a combination thereof.

Device Configuration

Next, a functional configuration example of each of the base station 10 and the communication device 20 that execute the processes and the operation described so far is described.

Base Station 10

Figure 14:
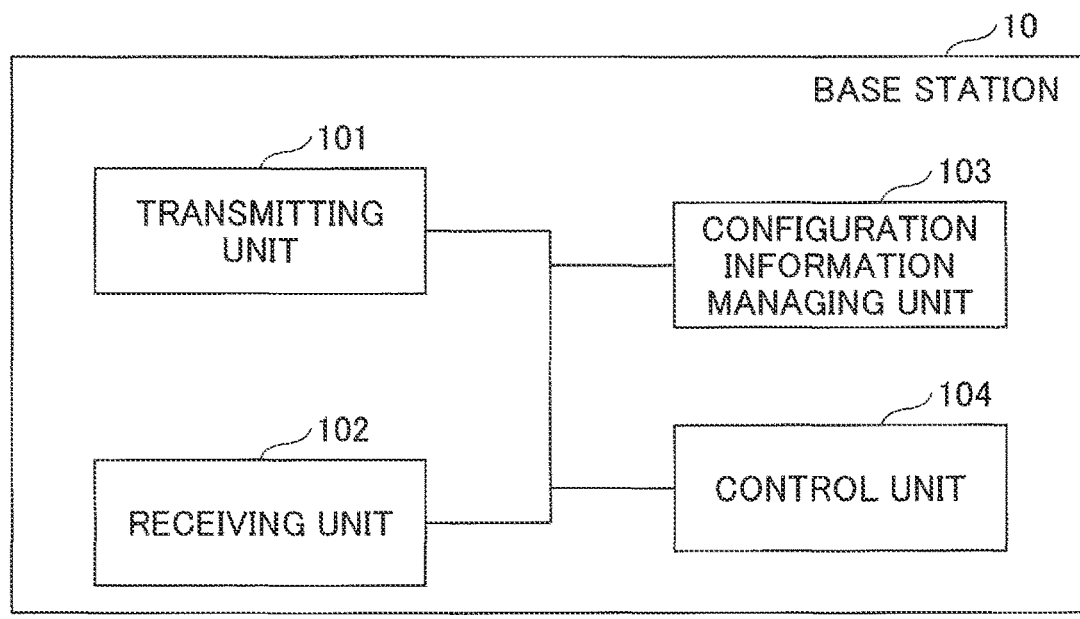
FIG. 14 is a diagram indicating an example of a functional configuration of a base station 10 according to an embodiment.

FIG. 14 is a diagram illustrating an example of a functional configuration of the base station 10. As illustrated in FIG. 14, the base station 10 includes a transmitting unit 101, a receiving unit 102, a configuration information managing unit 103, and a control unit 104. The functional configuration illustrated in FIG. 14 is only an example. As long as the operation according to the embodiments can be executed, the functional division and the name of the functional unit may be any division and name. Furthermore, the transmitting unit 101 may be referred to as a transmitter, and the receiving unit 102 may be referred to as a receiver.

The transmitting unit 101 has a function of generating a signal to be transmitted to the communication device 20 side and transmitting the signal wirelessly. The receiving unit 102 has a function of receiving various types signals transmitted from the communication device 20 and acquiring, for example, information of an upper layer from the received signals. Furthermore, the receiving unit 102 has a function of measuring the received signal and acquiring a quality value.

The configuration information managing unit 103 stores pre-configured configuration information, configuration information received from the communication device 20, and the like. Furthermore, configuration information related to transmission may be stored in the transmitting unit 101, and configuration information related to reception may be stored in the receiving unit 102. The control unit 104 controls the base station 10. The function of the control unit 104 related to transmission may be included in the transmitting unit 101, and the function of the control unit 104 related to reception may be included in the receiving unit 102.

For example, the receiving unit 102 receives the UE capability from the communication device 20. The control unit 104 determines a bandwidth part (or a numerology) configuration which can be supported by the communication device 20 on the basis of the UE capability received from the communication device 20. The control unit 104 generates information indicating the determined bandwidth part (or the numerology) configuration, and the transmitting unit 101 transmits a signal including the generated information to the communication device 20.

Communication Device 20

Figure 15:
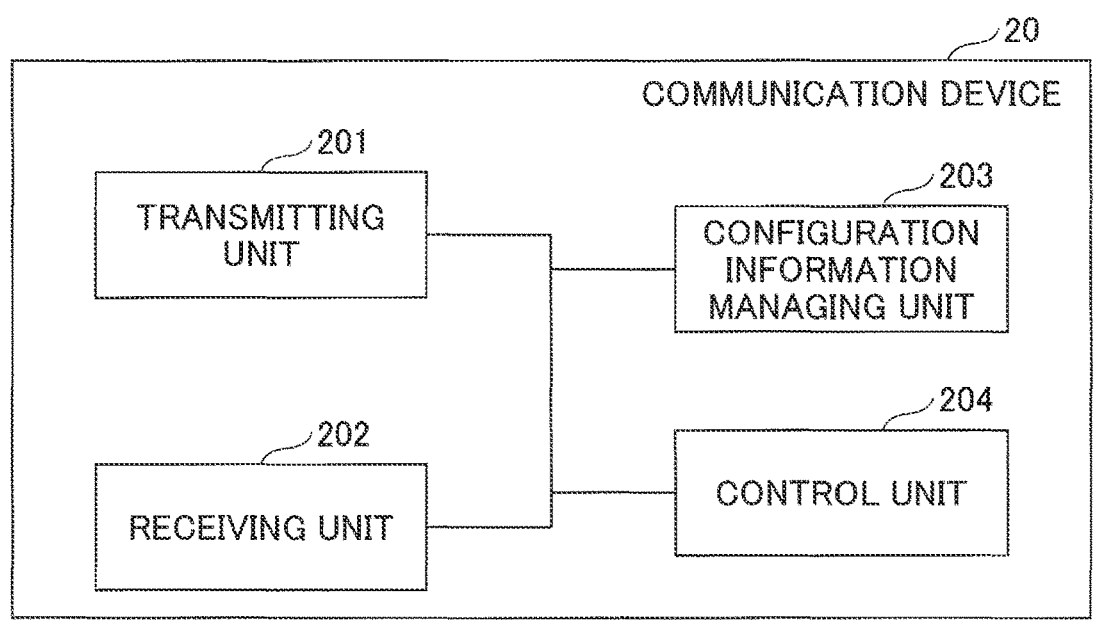
FIG. 15 is a diagram indicating an example of a functional configuration of a communication device 20 according to an embodiment.

FIG. 15 is a diagram illustrating an example of a functional configuration of the communication device 20. As illustrated in FIG. 15, the communication device 20 includes a transmitting unit 201, a receiving unit 202, a configuration information managing unit 203, and a control unit 204. The functional configuration illustrated in FIG. 15 is only an example. As long as the operation according to the embodiments can be executed, the functional division and the name of the functional unit nay be any division and name. Furthermore, the transmitting unit 201 may be referred to as a transmitter, and the receiving unit 202 may be referred to as a receiver. Furthermore, the communication device 20 may be the communication device 20A on the transmission side or the communication device 20B on the reception side.

The transmitting unit 201 generates a transmission signal from transmission data and transmits the transmission signal wirelessly. The receiving unit 202 wirelessly receives various types of signals, and acquires a signal of an upper layer from the received signal of the physical layer. Furthermore, the receiving unit 202 has a function of measuring the received signal and acquiring a quality value.

The configuration information managing unit 203 stores pre-configured configuration information, configuration information received from the base station 10, and the like. The configuration information managing unit 203 may store different values applicable to the transmitting device 20 for a configuration of a location of a PRB (Physical Resource Block), a configuration of subcarrier spacing, and a configuration of a Cyclic prefix (a configuration of a bandwidth part), for example. Furthermore, configuration information related to transmission may be stored in the transmitting unit 201, and configuration information related to reception may be stored in the receiving unit 202. The control unit 204 controls the communication device 20. Furthermore, the function of the control unit 204 related to transmission may be included in the transmitting unit 201, and the function of the control unit 204 related to reception may be included in the receiving unit 202.

For example, the control unit 204 configures the bandwidth part (or the numerology) for SL transmission and reception in the communication device 20 and the bandwidth part (or the numerology) for UL/DL transmission and reception on the basis of information indicating the physical resource block (PRB) location configuration, the subcarrier spacing configuration, and the cyclic prefix configuration (the bandwidth part configuration) received from the base station by the receiving unit 202.

Hardware Configuration

In the block diagrams (FIGS. 14 and 15) used for the description of the embodiment, the blocks of the functional units are illustrated. The functional blocks (configuring units) are implemented by an arbitrary combination of hardware and/or software. A device of implementing each functional block is not particularly limited. In other words, each functional block may be implemented by one device in which a plurality of elements is physically and/or logically combined or may be implemented by a plurality of devices, that is, two or more devices which are physically and/or logically separated and are directly and/or indirectly connected (for example, a wired and/or wireless manner).

Figure 16:
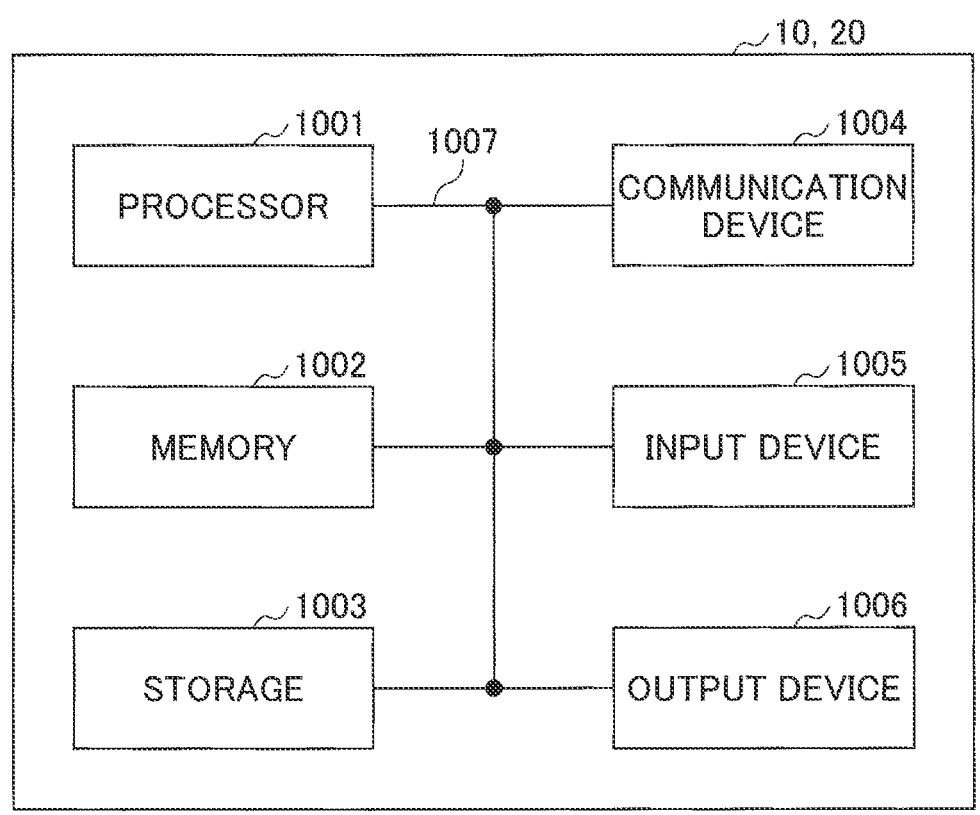
FIG. 16 is a diagram indicating an example of a hardware configuration of each of the base station 10 and the communication device 20 according to an embodiment.

Furthermore, for example, both the communication device 20 and the base station 10 in one embodiment of the present invention may function as a computer that performs the process according to the embodiments. FIG. 16 is a diagram illustrating an example of a hardware configuration of each of the communication device 20 and the base station 10 according to the embodiments. Each of the communication device 20 and the base station 10 may be physically configured as a computer device including a processor 1001, a memory 1002, a storage 1003, a communication device 1004, an input device 1005, an output device 1006, a bus 1007, and the like.

In the following description, the term "device" can be read as a circuit, device, unit, or the like. The hardware configuration of each of the communication device 20 and the base station 10 may be configured to include one or more devices indicated by 1001 to 1006 illustrated in the drawing or may be configured without including some devices.

Each function in each of the communication device 20 and the base station 10 is implemented such that predetermined software (program) is read on hardware such as the processor 1001 and the memory 1002, and the processor 1001 performs an operation and controls communication by the communication device 1004 and reading and/or writing of data in the memory 1002 and the storage 1003.

For example, the processor 1001 operates an operating system and controls the entire computer. The processor 1001 may be configured with a central processing unit (CPU) including an interface with a peripheral device, a control device, an operation device, a register, and the like.

Furthermore, the processor 1001 reads a program (program code), a software module, or data from the storage 1003 and/or the communication device 1004 out to the memory 1002, and executes various types of processes according to them. A program causing a computer to execute at least some of the operations described in the above embodiment is used as the program. For example, the transmitting unit 101, the receiving unit 102, the configuration information managing unit 103, and the control unit 104 of the base station 10 illustrated in FIG. 14 may be implemented by a control program which is stored in the memory 1002 and operates on the processor 1001. The transmitting unit 201, the receiving unit 202, the configuration information managing unit 203, and the control unit 204 of the communication device 20 illustrated in FIG. 15 may be implemented by a control program which is stored in the memory 1002 and operates on the processor 1001. Various types of processes have been described as being performed by one processor 1001 but may be performed simultaneously or sequentially by two or more processors 1001. The processor 1001 may be implemented by one or more chips. The program may be transmitted from a network via an electric communication line.

The memory 1002 is a computer readable recording medium and configured with at least one of a read only memory (ROM), an erasable programmable ROM (EPROM), an electrically erasable programmable ROM (EEPROM), a random access memory (RAM), and the like. The memory 1002 is also referred to as a "register," a "cache," a "main memory," or the like. The memory 1002 can store programs (program codes), software modules, or the like which are executable for carrying out the radio communication method according to an embodiment of the present invention.

The storage 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive) , a floppy (registered trademark) disk, a magnetic strip, and the like. The storage 1003 is also referred to as an "auxiliary storage device." The storage medium may be, for example, a database, a server, or any other appropriate medium including the memory 1002 and/or the storage 1003.

The communication device 1004 is hardware (a transmitting and receiving device) for performing communication between computers via a wired and/or wireless network and is also referred to as a "network device," a "network controller," a "network card," a "communication module," or the like. For example, the transmitting unit 201 and the receiving unit 202 of the communication device 20 may be implemented in the communication device 1004. Furthermore, the transmitting unit 101 and the receiving unit 102 of the base station 10 may be implemented in the communication device 1004.

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integrally configured (for example, a touch panel).

The respective devices such as the processor 1001 and the memory 1002 are connected via the bus 1007 to communicate information with each other. The bus 1007 may be configured with a single bus or may be configured with different buses between the devices.

Furthermore, each of the communication device 20 and the base station 10 may be configured to include hardware such as a microprocessor, a digital signal processor (DSP), an application specific integrated circuit (ASIC), a programmable logic device (PLD), or a field programmable gate array (FPGA) or all or some of the functional blocks may be implemented by hardware. For example, the processor 1001 may be implemented by at least one of these pieces of hardware.

Conclusion of the Embodiments

In this specification, at least the communication device described below is disclosed.

A communication device including a receiving unit that receives at least one of configuration information of a same center frequency used for downlink reception and sidelink reception in one slot or configuration information of a same center frequency used for uplink transmission and sidelink transmission in the one slot; and a control unit that configures, based on the received configuration information, at least one of the same center frequency for the downlink reception or the sidelink reception in the one slot or the same center frequency for the uplink transmission and the sidelink transmission in the one slot.

According to the above-described configuration, when the communication device consecutively performs reception of downlink and reception of sidelink in the same slot, the center frequency of reception of downlink and the center frequency of reception of sidelink can be configured to be identical to each other, or when transmission of uplink and transmission of sidelink are performed consecutively, the center frequency of transmission of uplink and the center frequency of transmission of sidelink can be configured to be identical to each other. Accordingly, an increase in the guard period associated with the switching of the center frequency can be suppressed.

The receiving unit may receive at least one of the configuration information of the same bandwidth used for the downlink reception and the sidelink reception in the one slot or the configuration information of the same bandwidth used for the uplink transmission and the sidelink transmission in the one slot, and the control unit may perform at least one of configuration of the same center frequency and the bandwidth for the downlink reception and the sidelink reception in the one slot or configuration of the same center frequency and the bandwidth for the uplink transmission and the sidelink transmission in the one slot on the basis of the received configuration information.

According to the above-described configuration, when the communication device consecutively performs reception of downlink and reception of sidelink in the same slot, the center frequency and the bandwidth of reception of downlink and the center frequency and the bandwidth of reception of sidelink can be configured to be identical to each other, or when transmission of uplink and transmission of sidelink are performed consecutively, the center frequency and the bandwidth of transmission of uplink and the center frequency and the bandwidth of transmission of sidelink can be configured to be identical to each other. Accordingly, an increase in the guard period associated with the switching of the center frequency and the bandwidth can be suppressed.

The receiving unit may receive configuration information of the same center frequency and the same bandwidth used for the downlink reception, the sidelink reception, uplink transmission, and sidelink transmission in the one slot, and the control unit may perform configuration of the same center frequency and the same bandwidth used for the downlink reception, the sidelink reception, the uplink transmission, and the sidelink transmission in the one slot on the basis of the received configuration information.

In a case in which the communication device consecutively performs reception of downlink, reception of sidelink, transmission of uplink, and transmission of sidelink in the same slot, the center frequency and the bandwidth for reception of downlink, reception of sidelink, transmission of uplink, and transmission of sidelink can be configured to be identical to each other. Accordingly, an increase in the guard period associated with the switching of the center frequency and the bandwidth can be suppressed.

A communication device including a receiving unit that receives at least one of an index indicating a center frequency used for downlink reception in one slot or an index indicating a center frequency used for uplink transmission in the one slot and a control unit that configures at least one of the same center frequency for the downlink reception and sidelink reception in the one slot or the same center frequency for uplink transmission and sidelink transmission in the one slot on the basis of the received index.

According to the above-described configuration, when the communication device consecutively performs reception of downlink and reception of sidelink in the same slot, information related to the center frequency for reception of sidelink is not received, and the center frequency of reception of downlink and the center frequency of reception of sidelink can be configured to be identical to each other, or when transmission of uplink and transmission of sidelink are performed consecutively, information related to the center frequency for transmission of sidelink is not received, and the center frequency of transmission of uplink and the center frequency of transmission of sidelink can be configured to be identical to each other. Accordingly, the increase in the guard period associated with the switching of the center frequency while reducing the overhead related to the notification of the center frequency related to transmission and reception of sidelink can be suppressed.

A base station including a control unit that configures at least one of information of the same center frequency for downlink reception and sidelink reception in one slot or information of the same center frequency for uplink transmission and sidelink transmission in the one slot and a transmitting unit that transmits at least one of the information of the same center frequency for the downlink reception and the sidelink reception in the one slot or the information of the same center frequency for the uplink transmission and the sidelink transmission in the one slot that is configured by the control unit.

According to the above-described configuration, when the communication device which has received the above information from the base station consecutively performs reception of downlink and reception of sidelink in the same slot, the center frequency of reception of downlink and the center frequency of reception of sidelink can be configured to be identical to each other, or when transmission of uplink and transmission of sidelink are performed consecutively, the center frequency of transmission of uplink and the center frequency of transmission of sidelink can be configured to be identical to each other. Accordingly, the increase in the guard period associated with the switching of the center frequency can be suppressed.

The control unit may configure at least one of information of the same center frequency and the same bandwidth for the downlink reception and the sidelink reception in the one slot or information of the same center frequency and the same bandwidth for the uplink transmission and the sidelink transmission in the one slot, and the transmitting unit may transmit at least one of the information of the same center frequency and the same bandwidth used for the downlink reception and the sidelink reception in the one slot or the information of the same center frequency and the same bandwidth used for the uplink transmission and the sidelink transmission in the one slot.

According to the above-described configuration, when the communication device which has received the information from the base station consecutively performs reception of downlink and reception of sidelink in the same slot, the center frequency and the bandwidth of reception of downlink and the center frequency and the bandwidth of reception of sidelink can be configured to be identical to each other, or when transmission of uplink and transmission of sidelink are performed consecutively, the center frequency and the bandwidth of transmission of uplink and the center frequency and the bandwidth of transmission of sidelink can be configured to be identical to each other. Accordingly, the increase in the guard period associated with the switching of the center frequency and the bandwidth can be suppressed.

Supplement of Embodiment

The embodiments of the present invention are described above, but the disclosed invention is not limited to the above-described embodiments, and those skilled in the art would understand various modified examples, revised examples, alternative examples, substitution examples, and the like. In order to facilitate understanding of the invention, specific numerical value examples have been used for description, but the numerical values are merely examples, and certain suitable values may be used unless otherwise stated. The classification of items in the above description is not essential to the present invention. Matters described in two or more items may be combined and used as necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no inconsistency. For the sake of convenience of processing description, the communication device 20 and the base station 10 have been described using the functional block diagrams, but such devices may be implemented by hardware, software, or a combination thereof. Software executed by the processor included in the communication device 20 according to the embodiment of the present invention and software executed by the processor included in the base station 10 according to the embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Although the embodiments are assumed to be mainly applied to the sidelink communication, the embodiments are not limited to sidelink but may be applied to DL/UL of cellular communication. In the embodiments, the numerology, the bandwidth part, and the slot length are described as a combination of radio parameters specifying an SL capability and a UE capability, but the combination of radio parameters is not limited thereto. For example, a notification indicating whether or not a mini-slot is supported, a corresponding format of dynamic TDD, whether or not a short/long PUCCH is supported, whether or not multilayer transmission of SL is supported (including information of a maximum of the number of layers and/or the number of ports) or the like may be given, or a combination to be applied among one or more combinations of radio parameters may be selected.

A notification of information is not limited to the aspect or embodiment described in this specification and may be given by any other method. For example, the notification of information may be given physical layer signaling (for example, downlink control information (DCI), uplink control information (UCI)), higher layer signaling (for example, radio resource control (RRC) signaling, medium access control (MAC) signaling, broadcast information (master information block (MIB), system information block (SIB)), other signals, or a combination thereof. Furthermore, the RRC signaling may be referred to as an "RRC message" and may be, for example, an RRC connection setup message, an RRC connection reconfiguration message, or the like.

Each aspect and embodiment described in this specification is applicable to Long Term Evolution (LTE), LTE-Advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), and systems using any other appropriate systems and/or next generation systems expanded on the basis of the systems.

The processing procedures, the sequences, the flowcharts, and the like of the respective aspects/embodiments described in this specification may be reversed in order unless there is a contradiction. For example, the method described in this specification presents elements of various steps in an exemplary order and is not limited to a presented specific order.

In this specification, a specific action that is supposed to be performed by the base station 10 may be performed by an upper node in some cases.

In the network including one or more network nodes including the base station 10, various operations performed for communication with the communication device 20 can be obviously performed by the base station 10 and/or any network node (for example, an MME, an S-GW, or the like is considered, but it is not limited thereto) other than the base station 10. The example in which the number of network nodes excluding the base station 10 is one has been described above, but a combination of a plurality of other network nodes (for example, an MME and an S-GW) may be provided.

Each aspect/embodiment described in this specification may be used alone, may be used in combination, or may be switched in association with execution.

The communication device 20 is also referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other appropriate terms, depending on those having skill in the art.

The base station 10 is also referred to as a Node B (NB)), an enhanced Node B (eNB), a base station, a gNB, or other appropriate terms, depending on those having skill in the art.

The term "determining" used in this specification may include a wide variety of actions. For example, "determining" may include, for example, events in which events such as judging, calculating, computing, processing, deriving, investigating, looking up (for example, looking up in a table, a database, or another data structure), or ascertaining are regarded as "determining." Furthermore, "determining" may include, for example, events in which events such as receiving (for example, receiving information), transmitting (for example, transmitting information), input, output, or accessing (for example, accessing data in a memory) are regarded as "determining." Furthermore, "determining" may include, for example, events in which events such as resolving, selecting, choosing, establishing, or comparing are regarded as "determining." In other words, "determining" may include events in which a certain operation is regarded as "determining."

A phrase "on the basis of" used in this specification is not limited to "on the basis of only" unless otherwise stated. In other words, a phrase "on the basis of" means both "on the basis of only" and "on the basis of at least."

"Include," "including," and variations thereof are intended to be comprehensive, similarly to a term "equipped with (comprising)" as long as the terms are used in this specification or claims set forth below. Furthermore, the term "or" used in this specification or claims set forth below is intended not to be an exclusive disjunction.

In the present disclosure, for example, when an article such as "a," "an," or "the" in English is added by a translation, such an article is assumed to include the plural unless it is obviously indicated that such an article does not include the plural.

The terms "selecting" and "extracting" used in this specification may include a wide variety of actions. For example, "selecting" and "extracting" may include, for example, events in which events such as calculating, calculating, computing, processing, deriving, investigating, looking up (for example, looking up in a table, a database, or another data structure), or ascertaining are regarded as "determining." Furthermore, "selecting" and "extracting" may include, for example, events in which events such as receiving (for example, receiving information), transmitting (for example, transmitting information), input, output, or accessing (for example, accessing data in a memory) are regarded as ""selecting" and "extracting." Furthermore, "selecting" and "extracting" may include, for example, events in which events such as resolving, selecting, choosing, establishing, or comparing are regarded as "selecting" and "extracting." In other words, "selecting" and "extracting" may include events in which a certain operation is regarded as "selecting" and "extracting."

Although the present invention has been described above in detail, it is obvious to those having skill in the art that the present invention is not limited to the embodiments described in this specification. The present invention can be carried out as revisions and modifications without departing from the gist and scope of the present invention defined by the claims set forth below. Accordingly, the description of this specification is intended to be exemplary and does not have any restrictive meaning to the present invention.

LIST OF REFERENCE SYMBOLS 101 transmitting unit
102 receiving unit
103 configuration information managing unit
104 control unit
201 transmitting unit
202 receiving unit
203 configuration information managing unit
204 control unit
1001 processor
1002 memory
1003 storage
1004 communication device
1005 input device
1006 output device

The invention claimed is:

1. A communication device comprising:
a receiver that receives configuration information of a bandwidth part, BWP, to be applied to a sidelink transmission; and
a controller that configures a frequency resource and a subcarrier spacing for the sidelink transmission based on the configuration information of the BWP,
wherein the configuration information of the BWP is configured independently of configuration information of a BWP to be applied to an uplink transmission, and
wherein the subcarrier spacing for the sidelink transmission configured by the controller is the same as a subcarrier spacing for the uplink transmission.

2. The communication device according to claim 1, wherein a cyclic prefix for the sidelink transmission configured by the controller is the same as a cyclic prefix for the uplink transmission.

3. A communication method executed by a communication device, the method comprising:
receiving configuration information of a bandwidth part, BWP, to be applied to a sidelink transmission; and
configuring a frequency resource and a subcarrier spacing for the sidelink transmission based on the configuration information of the BWP,
wherein the configuration information of the BWP is configured independently of configuration information of a BWP to be applied to an uplink transmission, and
wherein the configured subcarrier spacing for the sidelink transmission is the same as a subcarrier spacing for the uplink transmission.

4. A base station comprising:
a controller that configures configuration information of a bandwidth part, BWP to be applied to a sidelink transmission independently of configuration information for a BWP to be applied to an uplink transmission; and
a transmitter that transmits the configuration information of the BWP to be applied to the sidelink transmission configured by the controller,
wherein the controller controls a configuration of a frequency resource and a subcarrier spacing for the sidelink transmission by the communication device based on the configuration information of the BWP to be applied to the sidelink transmission, and
wherein the subcarrier spacing for the sidelink transmission controlled by the controller is the same as a subcarrier spacing for the uplink transmission.

* * * * *